Dec. 1, 1953     E. A. SCHONROCK     2,661,236
WINCH AND SPRING SUSPENSION CONSTRUCTION FOR DUMP TRAILERS
Filed March 26, 1952     5 Sheets-Sheet 1
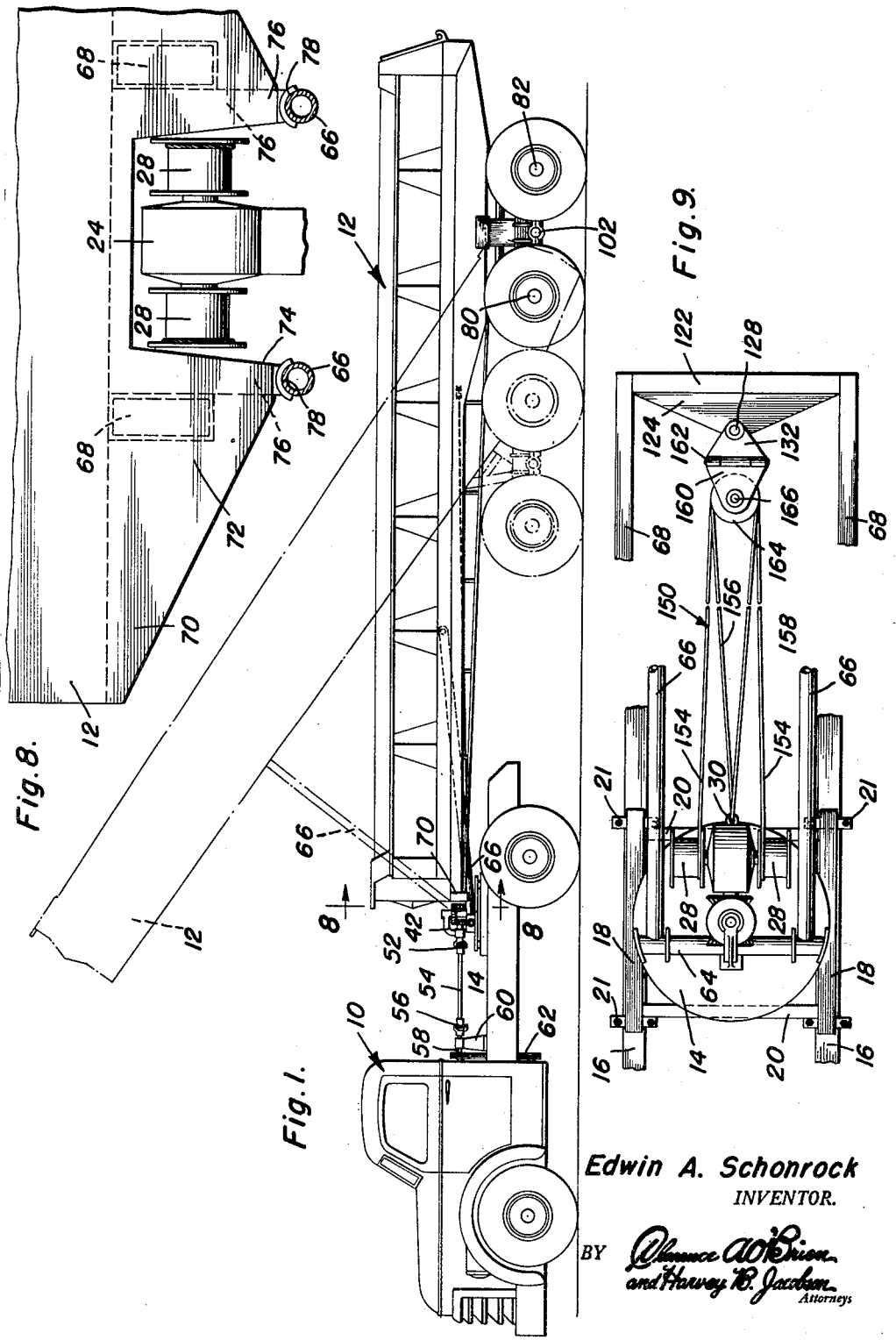
Edwin A. Schonrock
INVENTOR.

Dec. 1, 1953     E. A. SCHONROCK     2,661,236
WINCH AND SPRING SUSPENSION CONSTRUCTION FOR DUMP TRAILERS
Filed March 26, 1952     5 Sheets-Sheet 2
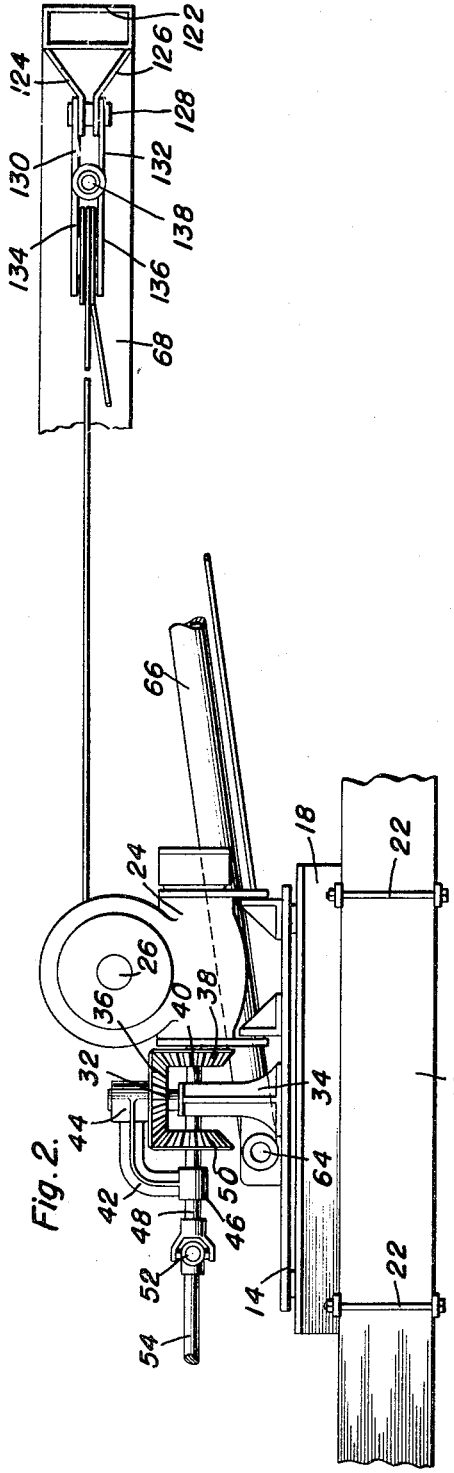
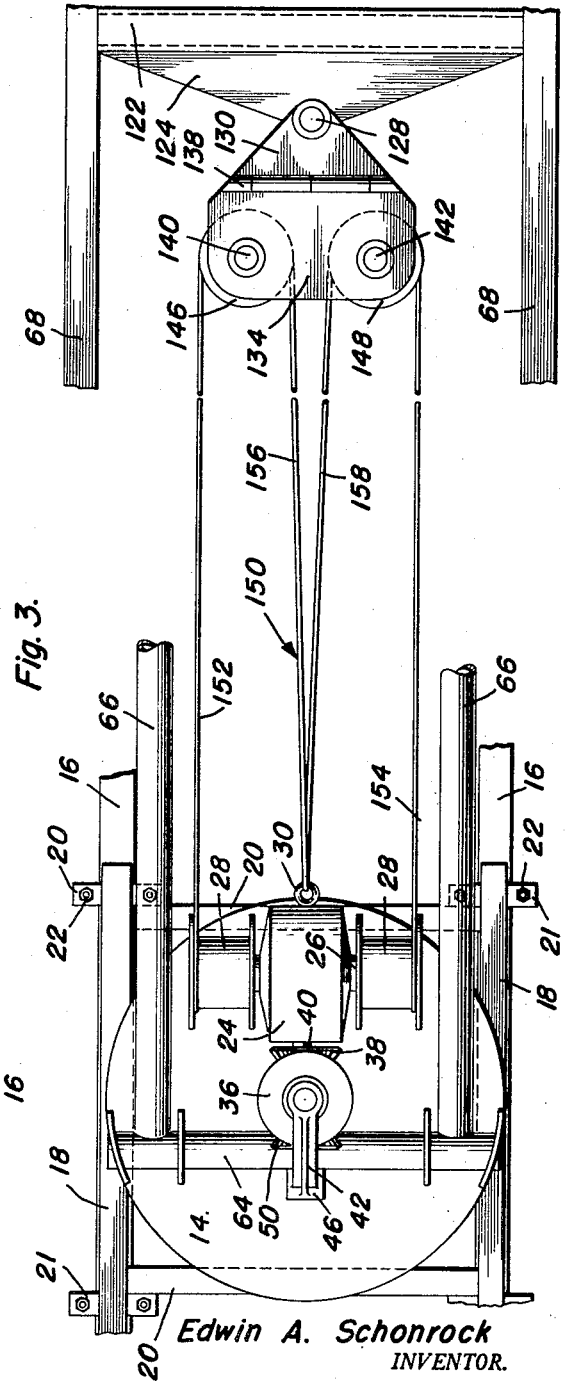
Edwin A. Schonrock
INVENTOR.

Edwin A. Schonrock
INVENTOR.

Edwin A. Schonrock
INVENTOR.

Patented Dec. 1, 1953

2,661,236

UNITED STATES PATENT OFFICE 2,661,236

WINCH AND SPRING SUSPENSION CONSTRUCTION FOR DUMP TRAILERS

Edwin A. Schonrock, San Angelo, Tex.

Application March 26, 1952, Serial No. 278,546

5 Claims. (Cl. 298—20)

1

This invention comprises novel and useful improvements in a winch and spring suspension construction for dump trailers, and more particularly relates to a lifting mechanism for effecting tilting of the body of the trailer vehicle about a rear axle to a load dumping position. The subject matter set forth in this application constitutes an improvement over my prior Patent No. 2,517,933, patented August 8, 1950; and also over my prior pending application Serial No. 207,158, filed January 22, 1951, for Lifting Device for a Dump Trailer.

The primary object of this invention is to provide an improved dump trailer having a novel and improved spring suspension system for supporting the same upon tandem wheels whereby the trailer may be tilted to a dumping position while both of the tandem wheels remain in load supporting contact upon the ground.

A further important object of the invention is to provide an improved dump trailer in conformity with the foregoing object in which an improved and novel winch construction is mounted upon the fifth wheel of the truck for applying power to tilt the dump trailer body to its dumping position; and wherein an improved transmission mechanism is provided for connecting the winch system to the power take-off of a truck.

Yet another important object of the invention is to provide an improved dump trailer in which the winch upon the fifth wheel shall be connected to the trailer in an improved manner through the use of flexible cables for effecting the dumping of the trailer.

These, together with various ancillary features and objects of the invention, which will later become apparent as the following description proceeds, are attained by the present invention, a preferred embodiment of which has been illustrated, by way of example, in the accompanying drawings, wherein:

Figure 1 is a side elevational view showing a truck and dump trailer assembly, incorporating therein the principles of this invention, the same being shown in side elevation and in full lines in the normal load carrying position, and in dotted lines in the tilted dumping position;

Figure 2 is a fragmentary elevational detail view, taken upon an enlarged scale, parts being broken away and shown in section, and showing the mounting of the fifth wheel upon the chassis of the truck, the winch mechanism upon the fifth wheel, and a portion of the flexible cable for operatively connecting the winch with the dump trailer for actuating the tilting mechanism of the same;

Figure 3 is a fragmentary horizontal plan view of the mechanism of Figure 2, parts of the mechanism being broken away and shown in section;

Figure 8 is a vertical transverse sectional view taken upon an enlarged scale substantially upon the plane indicated by section line 8—8 of Figure 1, parts being broken away; and Figure 9 is a horizontal plan view similar to Figure 3 but showing a slightly modified construction for attaching the cable to the trailer body.

Figure 4:
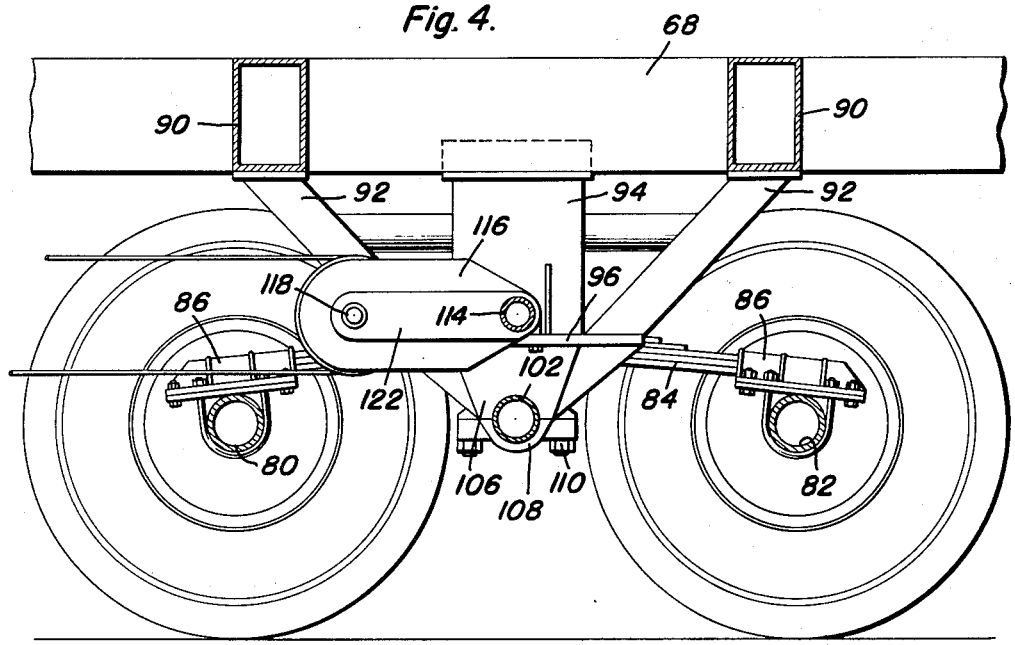
Figure 4 is a detail view taken in vertical section in an enlarged scale through a portion of the rear wheels of the dump trailer and showing the spring suspension and mounting of the same.

Referring now more specifically to the accompanying drawings, wherein like numerals designate similar parts throughout the various views, attention is directed first to Figure 1 wherein the numeral 10 designates generally any desired type of truck or tractor vehicle to which is detachably connected a dump trailer indicated generally by the numeral 12. The truck or tractor, as the same will hereinafter be designated, is provided with a fifth wheel assembly indicated by the numeral 14 and to which the dump trailer 12 is detachably coupled as set forth hereinafter.

Although certain features of this invention are not necessarily restricted thereto, the dump trailer illustrated is provided with a pair of tandem rear axles and wheels, and is pivotally mounted upon this tandem wheel assembly for vertical pivoting dumping movement thereon as suggested by the dotted and full lines of Figure 1.

Referring now particularly to Figures 1–3, it will be seen that the chassis of the tractor comprises a pair of longitudinal side frame members 16 and the fifth wheel assembly including its supporting platform is detachably secured to these frame members. Thus, a pair of parallel longitudinally extending frame members 18 and transversely extending frame members 20 attached rigidly to 18 constitute the base of the fifth wheel assembly and rest upon the top of the tractor frame members 16, and are secured thereto as by means of holding straps 21 with clamping bolts 22.

Mounted upon the fifth wheel assembly 14 is a winch casing 24, see Figures 2 and 3, having a winch or drum shaft 26 extending transversely therethrough, and beyond the opposite sides thereof. Fixedly secured to the ends of this drum shaft are a pair of drums 28, while a cable anchor such as an eye bolt, pulley or the like 30 is secured to the casing 24.

A vertical drive shaft 32 is disposed axially of the fifth wheel assembly 14, being journaled in a standard 34 thereon, and this drive shaft is provided with a driving gear 36 upon its upper end. The gear 36 is continuously in mesh with a gear 38 fixedly secured to the winch driving shaft 40 which is connected to the drum shaft 26 within the casing 24 by any desired gearing assembly.

A carrier 42, consisting of an L-shaped member, is provided with a journal 44 which is freely and rotatably received upon the upper end of the vertical drive shaft 32, and is further provided with a journal member 46 in which is journaled a stub axle 48 having a gear 50 which is in mesh with the gear 36.

By means of a universal joint 52, a connecting drive shaft 54 is coupled to a universal joint 56 which in turn is connected to a countershaft 58 journaled in a standard 60 carried by the tractor, and coupled as by means of a sprocket chain or the like 62 to the power take-off of the tractor. Thus, power is applied from the engine of the tractor to the winch mechanism upon the fifth wheel, and since the carrier 42 is freely rotatably supported upon the vertical drive shaft 32, it is evident that rotation of the fifth wheel will in no way impair the driving relationship of the tractor power take-off to the winch assembly.

There is journaled upon the fifth wheel 14, a transverse axle 64 to which is fixedly secured a pair of parallel lift arms 66. These lift arms in turn are pivoted at their opposite ends to the side frame members 68 of the trailer dump body, in any desired manner. If desired, the lift arms can be secured to the dump body in the same manner set forth in my above identified patent and my above identified copending application.

Referring now more particularly to Figures 1 and 8, it will be seen that the forward end of the body of the trailer 12 is provided with a transverse frame member 70 extending therebeneath, this frame member having a central depending portion 72 which at its midportion is recessed or cutaway to provide a recess or clearance 74 upon its undersurface. This clearance, as shown in Figure 8, is adapted to receive and embrace the winch assembly when the body is in its lowered position. On opposite sides of the recess 74, and positioned against and adjacent the transverse frame member position 72, the main longitudinal frame members 68 are provided with a pair of depending supporting lugs 76. Upon their lower surface, these lugs are provided with semi-cylindrical seats 78 which are adapted to partially embrace and rest upon the upper surfaces of the lift arms 66 when the dump body is in its lowered position as shown in full lines in Figure 1. By this means, the front end of the trailer body rests upon the lift arms just above and over the fifth wheel assembly to steady and support the front end of the trailer body, while the rearward ends of the lift arms being pivotally attached to the trailer body serve to couple the same to the tractor.

Attention is now directed more specifically to Figures 1, 4–6, for a consideration of the tandem, rear axle assembly of the dump trailer body. It will be seen that this rear axle assembly comprises a pair of dead axles 80 and 82 disposed in parallel relation, and to which are secured the opposite ends of a pair of leaf springs 84 as by means of spring clip members 86.

A support means is provided for supporting the rear portion of the dump trailer body upon the tandem spring assembly. This support means includes the longitudinally extending frame members of the truck body, as shown at 68, suitable transverse frame members 90 being connected and rigidly secured to and between frame members 68. The body of the dump trailer is of course rigidly secured to the frame members 68 and 90 in any desired manner to form a rigid assembly therewith.

A plurality of support members and braces 92 and 94 are secured at their upper ends to the frame members 68 and 90, and at their lower ends are connected to a pair of horizontally disposed plates 96. The above mentioned elements may be welded or otherwise rigidly secured to provide a sturdy and rigid supporting assembly.

Depending from the plates 96 are a pair of standards 98 having semi-cylindrical bearing recesses in their lower surfaces and comprising stools which are detachably connected by means of bearing caps 100 which are welded or otherwise rigidly secured to a trunnion shaft 102. Suitable fastening bolts 104 serve to removably secure the stools 98 to the plates 96. This arrangement permits the use of different sizes of stools in order to attach the supporting framework of the truck body to the trunnion shaft 102 when it is desired to vary the spacing of the truck with respect to the rear axle assembly.

The trunnion shaft 102 is in turn rotatably journaled at its extremities in a depending bearing member 106 mounted upon the springs 84 and having a removable bearing cap 108. The cap may be detachably secured to the bearing member as by fastening bolts 110, and preferably the ends of the trunnion 102 may be set in rubber bushings in the bearing and bearing cap 106 and 108 for a limited oscillatory movement. It is contemplated that the trunnion shall have a pivoting movement in this bearing.

It will thus be apparent that the dump trailer body is fixedly secured to the trunnion and the latter is pivotally secured to the springs of the rear axle assembly, whereby the dump body has a tilting movement, as will be apparent from the comparison of the full line and dotted line showings of Figure 1. During this tilting movement, however, it shall be specifically noted that the tandem wheel assembly remains at all times upon the supporting surface or roadway, while the pivoting of the dump body is solely about the axis of the trunnion 102.

Clamped by means of clamping bolts 112 to the adjacent top surfaces of the horizontal plates 96, is a pulley axle 114. A pulley block 116 is pivotally secured at one end upon the pulley axle 114, and extends forwardly therefrom, being provided at its forward end with a pulley shaft 118 upon which is journaled a plurality of pulleys or sheaves 120. The sides of the pulley block are preferably provided with longitudinally extending reinforcements 122 which may be either integrally or separately formed and secured between the sides of the pulley block and to the pulley axle 114 and the pulley shaft 118.

Figure 5:
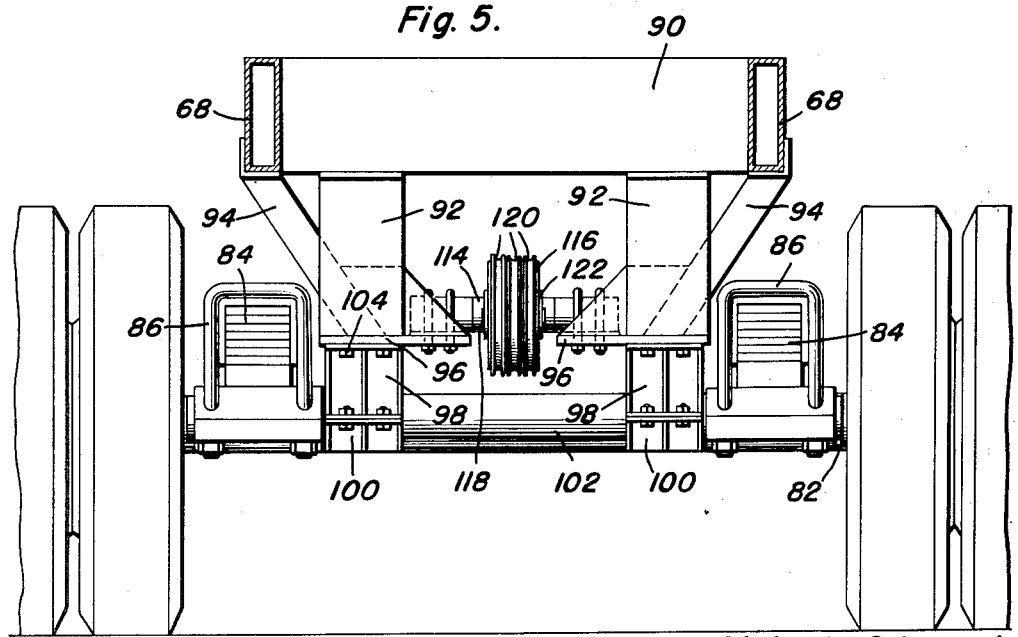
Figure 5 is a detail view taken upon an enlarged scale and showing in transverse vertical section the construction of Figure 4.
Figure 6:
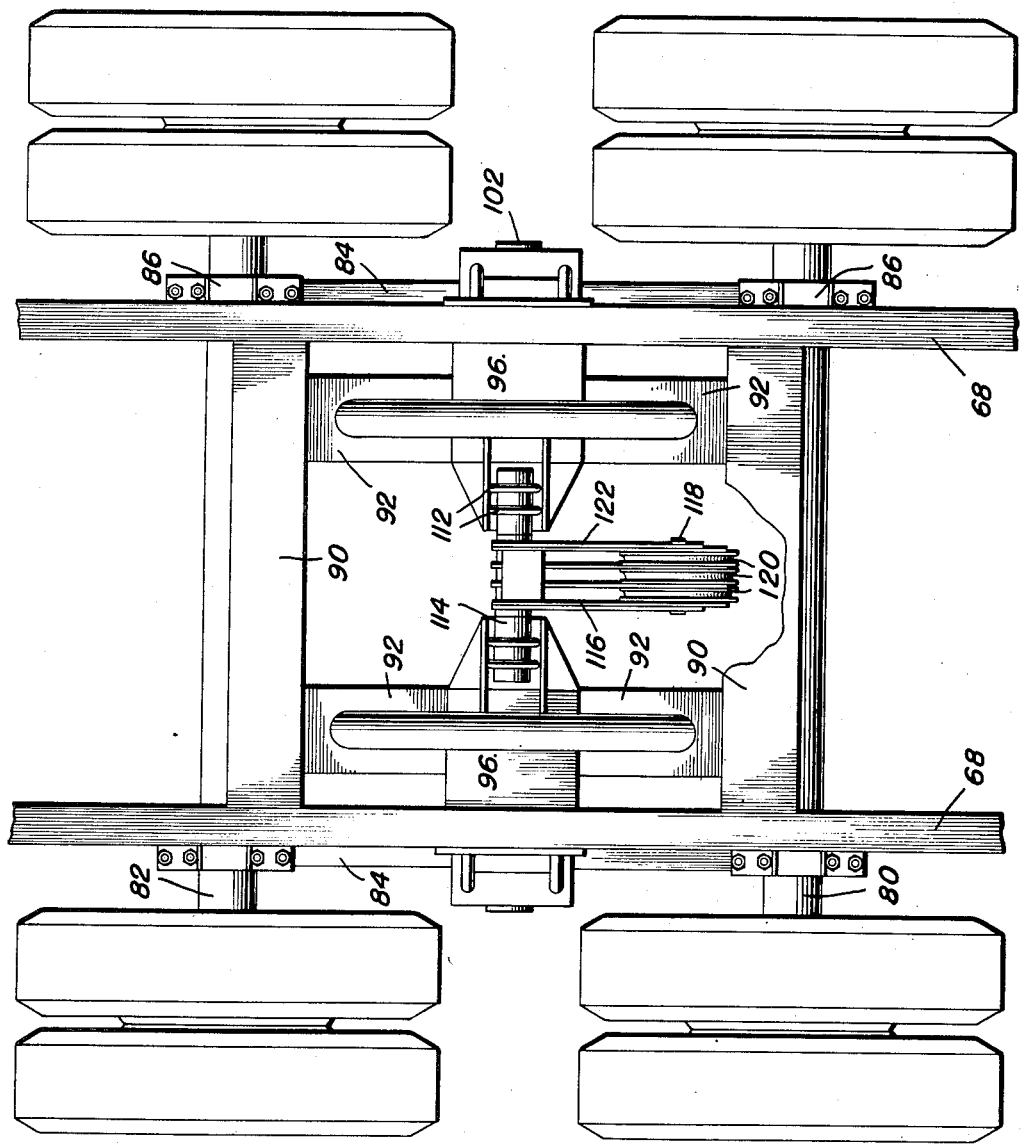
Figure 6 is a horizontal plan view, parts being broken away, taken upon an enlarged scale and showing the construction of Figures 4 and 5.
Figure 7:
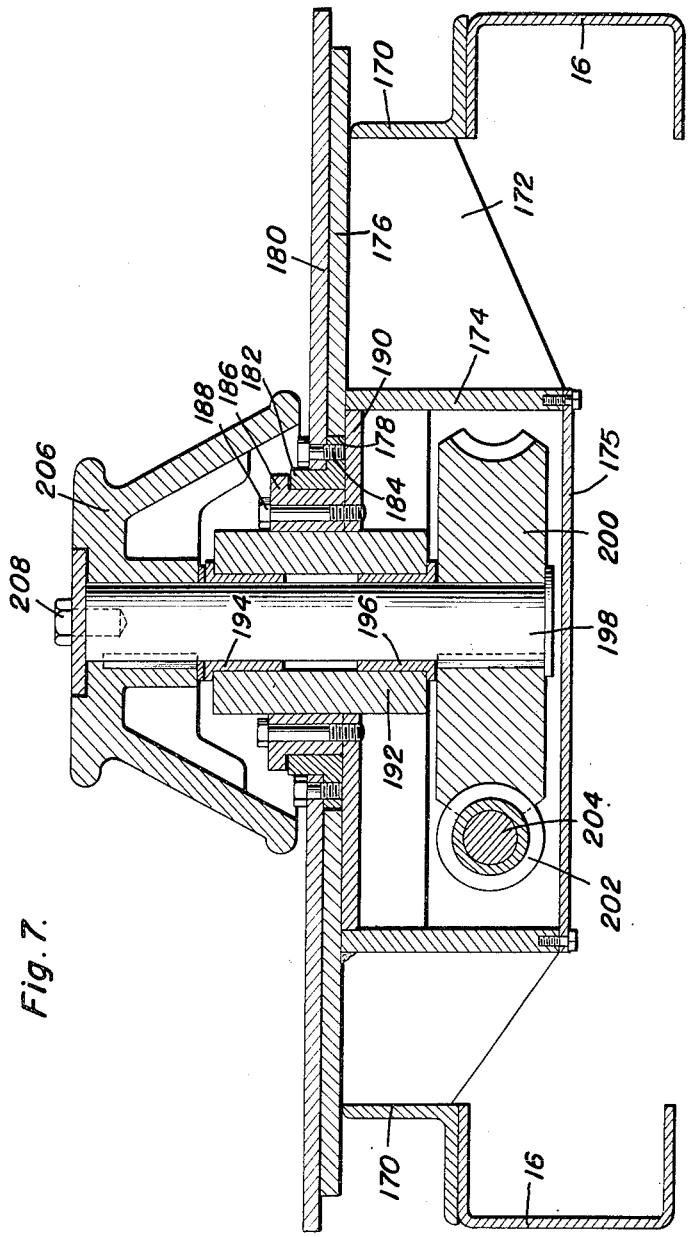
Figure 7 is a vertical transverse sectional detail view taken upon an enlarged scale through a portion of the truck chassis and the fifth wheel construction thereof of a modified form of fifth wheel driving and winch mechanism.

It will be particularly noted from Figure 4 that the pulley axle 114 is mounted directly above the trunnion 102 and above the horizontal plane through the tandem axles 80 and 82. In addition, the pulley shaft 118 is disposed in substantially the same horizontal plane as the pulley axle 114, but is disposed above and forwardly of the trunnion, and above the horizontal plane through the tandem axles.

Where the three pulley or three sheave arrangement of Figures 4–6 is employed, a double block will be mounted upon the anchor member 30, and a single cable will have one end secured to the anchor 30, and be entrained over the triple sheaves and the double block, with its free end secured to one of the winch drums 28, or to the single winch drum shown in Figure 7. Consequently, when the winch drum is actuated, the cable will be reeled in, thereby moving the trailer towards the tractor, and by virtue of the lift arms which are pivotally connected to both the tractor and trailer, will cause the trailer body to move upwardly into a tilting position. As hereinbefore pointed out, during this tilting movement the tandem axle assembly will remain in fixed relation to the road bed, with the entire trailer unit tilting about the trunnion carried by the tandem axle assembly.

However, in place of the triple pulley assembly of Figures 4–6, I may prefer to utilize the pulley arrangement of Figures 2, 3 or of Figure 9. Referring now to the drawings illustrating the modified pulley arrangement of Figures 2 and 3, it will be seen that the trailer frame members 68 are provided with a transverse frame member 122 having a pair of upper and lower triangular flanges 124 and 126 which at their forwardly extending apex are provided with a vertical pivot pin 128. Secured to these flanges by the vertical pivot pin 128, is a pulley supporting assembly comprising a pair of upper and lower triangular plates 130 and 132 which are hingedly connected to a pair of upper and lower pulley block plates 134 and 136 by a horizontally extending axle or hinge pin 138. A pair of vertical pulley shafts 140 and 142 are disposed between the plates 134 and 136 to journal sheaves 146 and 148 thereon.

A flexible member in the form of a cable indicated generally by the numeral 150 serves to operatively connect the pulleys 146 and 148 with the winch drums 28. This cable has its end portions 152 and 154 each connected to one of the winch drums 28 at the outer side of the same. The intermediate portion of the cable is slidingly received in the anchor member 30, while other portions 156 and 158 extend from the anchor 30 respectively to the pulleys 146 and 148.

From the arrangement in Figure 3 it will thus be seen that when the winch drums are actuated, an even pull will be applied to the two pulleys 146 and 148, since the midportion of the cable is free to slip in the anchor member 30 to equalize the strain of the two end portions of the cable. Thus, the trailer will be moved towards the tractor, and the lift arms will tilt the trailer body in the manner previously described. It will be noted that during this movement, in this arrangement, the pulley assembly is free to pivot about the vertical axle 128; the block assembly is free to pivot about the horizontal axle 138; while the lift arms and the winch assembly can pivot the axis of the fifth wheel. During this latter pivoting movement, it will be of course apparent that the tension of the cable will be adjusted by slippage of the midportion of the same through the anchor member 30.

In addition to the embodiment of Figures 2 and 3, it is also possible to use a somewhat similar arrangement of the cable and pulley mechanism, as shown in Figure 9. In the embodiment of Figure 9, the same parts referred in connection with the pulley arrangement of Figures 2 and 3, as well as the general truck and trailer construction of Figures 1–8 is employed and the same reference numerals have been applied. However, in this arrangement the pulley block top and bottom plates 134 and 136 are replaced by a pair of upper and lower plates 160, which are connected by the horizontally extending hinge 162 to the previously mentioned upper and lower plates 130 and 132 secured by the vertical pivot pin 128 to the flange members 124 and 126 previously mentioned. However, in this arrangement the pulleys 146 and 148 together with their pulley shafts 140 and 142 are replaced by a pair of pulleys 164 which are mounted upon the same pulley shaft 166. The pulley shaft 166 likewise is perpendicular and parallel to the pivot pin 128. In this arrangement, the flexible member or cable 150 has its end portions 152 and 154 secured to the pair of winch drums 128, but at the inner sides of the same instead of the outer sides as previously mentioned. Similarly, the midportion of the cable is slidingly received in the anchor member 30, while the other portions 156 and 158 are entrained over the two pulleys 164. The operation of this form of the invention is identical with that previously described and further explanation is believed to be unnecessary. However, it will be appreciated that a somewhat more compact arrangement is made since but a single pulley shaft is provided for the pair of pulleys as compared with the pair of pulley shafts in the arrangement of Figure 3.

Figure 7 refers to a modified form of winch assembly which is specifically applicable for use with the three pulley arrangement of Figures 4–6. In this embodiment, it will be seen that the tractor frame members 16 have mounted thereon a pair of angle iron members 170 which constitute longitudinally extending frame members of the fifth wheel platform assembly. The members 170 may be secured as by bolting, welding or the like or in any other desired manner, and by means of transverse web members 172 which are composed of vertical plates, support a central casing 174 having a removable bottom closure 175. If desired, the members 172 may be welded to the members 170 and 174, while a top platform for the fifth wheel assembly consisting of a plate 176 is likewise supported and welded to the members 172 and 174. The member 176 is provided with a central aperture 178 and a fifth wheel in the form of a disk or plate 180 has a bearing member 182 removably secured to its centrally apertured portion as by fastening bolts 184. Received within the bearing member 182 is a bearing collar 186 secured as by bolts 188 to the closure member 190 of the casing 174. Extending through the bearing collar 186 is a bushing or tubular member 192 which by means of journal bearings 194 and 196 supports and journals a vertical winch drive shaft 198. The lower end of the shaft extending into the casing 174 is provided with a gear 200 which is continuously in mesh with a gear 202 carried by a shaft 204 which extends from the housing 174 and is coupled in any desired manner to the power take-off of the tractor.

That portion of the vertical shaft 198 which extends above the bushing member 192 has fixedly secured to the same a winch drum 206, as by means of a fastening bolt 208.

In this arrangement it will be apparent that the fifth wheel 180 is free to rotate, being journaled upon the members 186, 190 and 174 and 176, while the winch is free to operate without interfering with the fifth wheel operation.

The form of winch and winch operating mechanism shown in Figure 7 is especially adapted for use in the three pulley system of Figures 4-6, and the two pulley block referred to in connection with that arrangement.

It is to be understood that either of the winch driving means disclosed may be equally employed with any of the three different pulley arrangement of Figures 4-6, 3 and 9, and any of the foregoing may be utilized with the spring suspension system of the tandem axle arrangement.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A spring suspension system for a dump trailer comprising a pair of load bearing axles, a pair of springs each connected to both of said axles, a trunnion mounted on said springs, a support pivoted upon said trunnion for pivoting movement thereon, said support including members adapted for fixed attachment to the body of a dump trailer, said support including a pulley supporting axle, pulley sheaves supported by said pulley axle and adapted for connection with the actuating cable of a body dump mechanism, said pulley axle being parallel to said trunnion, a pulley block carried by said pulley axle, each of said sheaves being mounted in said block for rotation about an axis which is displaced from said pulley axle.

2. In a dump trailer construction, a fifth wheel mounted upon a tractor vehicle, a dump trailer body, a pair of lift arms pivoted to said fifth wheel and to said body and coupling said body to said fifth wheel, a tandem rear axle assembly, means pivotally mounting said body upon said axle assembly, pulleys mounted upon said body, a winch mounted upon said fifth wheel, a cable connecting said pulleys and said winch, means operatively connecting said winch to the power take-off of said tractor vehicle, said connecting means comprising a vertical drive shaft disposed axially of said fifth wheel, said winch comprising a drum mounted upon the upper end of said vertical drive shaft, a gear secured to the lower end of said vertical drive shaft below said fifth wheel, a power transmitting shaft operatively connected to said gear and to a tractor vehicle power take-off.

3. A spring suspension system for a dump trailer comprising a pair of load bearing axles, a pair of springs each connected to both of said axles, a trunnion mounted on said springs, a support pivoted upon said trunnion, said support including members adapted for fixed attachment to the body of a dump trailer, said support including a supporting axle, further members pivoted upon said supporting axle, and a draft means pivotally connected to said further members upon an axis which is displaced from said supporting axle and adapted for connection with a body dump mechanism.

4. A dump trailer comprising a tandem rear axle assembly, a dump body, means pivoting the rear end of said dump body to said tandem rear axle assembly for vertical tilting movement from a substantially horizontal load carrying position to a sharply inclined dumping position while all of the wheels of the tandem rear axle assembly support the load of the dump body, combined draft and lifting means pivotally connected to the dump body and to a towing vehicle, and means for shortening the distance from the tandem rear axle assembly to a towing vehicle whereby said combined draft and lifting means will cause tilting of said dump body about said tandem rear axle assembly to a dumping position.

5. A dump trailer comprising a tandem rear axle assembly, a dump body, means pivoting the rear end of said dump body to said tandem rear axle assembly for vertical tilting movement from a substantially horizontal load carrying position to a sharply inclined dumping position while all of the wheels of the tandem rear axle assembly support the load of the dump body, and means operatively connected to said dump body for tilting the latter from a normal load carrying position to a dumping position.

EDWIN A. SCHONROCK.

References Cited in the file of this patent

UNITED STATES PATENTS

| Number | Name | Date |
|--------|------|------|
| 1,840,435 | Davis | Jan. 12, 1932 |
| 2,309,787 | Quintin et al. | Feb. 2, 1943 |
| 2,517,933 | Schonrock | Aug. 8, 1950 |
| 2,542,795 | Clement et al. | Feb. 20, 1951 |
| 2,605,134 | Clement et al. | July 29, 1952 |